April 13, 1954  R. HENRY  2,675,045
RUBBER WHEEL FOR COTTON PICKERS
Filed April 16, 1952
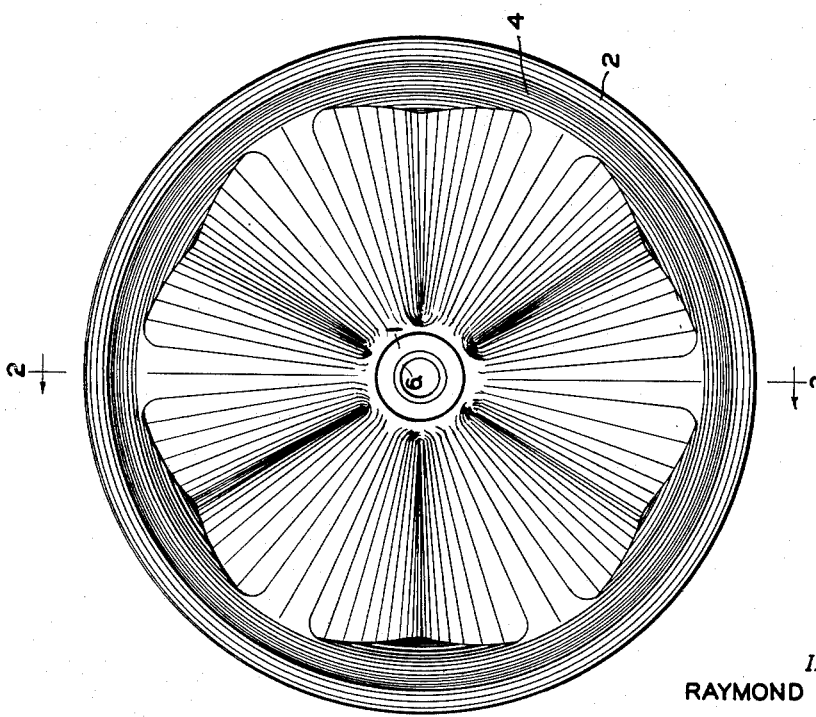
INVENTOR.
RAYMOND HENRY
BY
Merrill M. Blackburn
Atty.

Patented Apr. 13, 1954

2,675,045

UNITED STATES PATENT OFFICE 2,675,045

RUBBER WHEEL FOR COTTON PICKERS

Raymond Henry, Moline, Ill.

Application April 16, 1952, Serial No. 282,519

3 Claims. (Cl. 152—7)

The present invention relates to wheels for implements, and especially to rubber wheels for cotton pickers. In cotton pickers provided with rigid wheels, there is a tendency for the wheels to pick up sand and dirt, especially sand, and raise it as the wheel rotates, dropping it on the wheel bearing, and causing unnecessary wearing of the bearing. This I obviate by making the wheels of graduated rubber, using substantially inflexible rubber for the hub and soft, flexible rubber for the rims, so that, as the bottom of the rim turns out of contact with the ground, the part of the rim, as it leaves the ground, will flex and be shaped to cause the sand picked up by the rim to be discharged from the wheel before it reaches a position above the axle. Therefore, the sand will not be in a position to be deposited on the bearing and thus cause wear.

In the drawings annexed hereto and forming a part hereof,

Fig. 1 shows a side view of a wheel in accordance with my invention;

Fig. 2 shows a cross-section of this wheel substantially along the plane indicated by the line 2—2 in Fig. 1; and Fig. 3 is a development of Fig. 2 along the line 3—3, Fig. 2.

It will of course be understood that, since the hub 1 is made of substantially hard rubber and the rim 2 of soft or yielding rubber, there must be rubber of varying hardness between the two. Further, metal inserts 6 are put into the hub to give additional strength, as well as to provide a wearing surface for the bearing. However, the disk 3 does not need to have a great deal of variation in hardness, because of the corrugations in the disk, but the part next to the hub resists more strongly any tendency to bend than the part farther out, toward the rim. This latter is approximately at a right angle to the disk but has the inner surface sloping outwardly, as shown at 4, at an angle of about thirty degrees (30°), to shed any sand or dirt carried up by the rim. The outer face of the rim 5 is concaved so that, as the wheel rides over the ground, the surface of the rim in contact with the ground yields and, as the rim leaves the ground, it straightens again, which tends to loosen any sand or dirt which may have accumulated on the inner face 4 of the rim so that the particles of sand and chunks of dirt fall off of the rim as the wheel rolls along.

In my prior application, Serial No. 277,419, filed March 19, 1952, the disk has corrugations which are shallow next to the hub and deep next to the rim, while in the present construction, the corrugations are deep next to the hub and shallow next to the rim. The present construction gives a chance for more flexibility of the rim than in the prior construction. The wheel of the present construction is much more rigid than the wheel of the prior construction, although the rim of the prior construction is more rigid and opposes deformation more than the rim of the present construction. The rim of the present construction is concave, rather than convex, as in the prior construction, and the rim of the present construction is thinner than that of the prior construction. Therefore, the present construction is subject to bending more than the prior construction, and will shed dirt more readily.

It will of course be understood that the specific description of structure set forth above may be departed from without departing from the spirit of this invention as disclosed in this specification and as defined in the appended claims.

Having now described my invention, I claim:

1. A molded rubber wheel for cotton pickers and other implements, comprising a rim, a substantially cylindrical hub, and a central web section formed as a corrugated disk, the corrugations of which extend radially outwardly from said hub, said corrugations having a depth such that, at the point where the web joins the hub, the depth of said corrugations progressively decreasing radially outwardly from the hub to the point where said web joins said rim, at which point the depth of said corrugations are several times as small as the depth of the corrugations at said hub, said rim, web section, and hub being formed as a continuous homogeneous part except that the composition thereof is such that the hub is of substantial rigidity, and the rim being relatively flexible.

2. A molded wheel comprising a hub, a web section, and a rim portion, all formed as a homogeneous mass of rubber-like material and having flexibility, said rim portion being formed to have radially inner surfaces lying laterally outwardly of said web section, where the rim joins the web section and flaring laterally outwardly of the wheel, the radially outer surface of said rim being substantially toroidal and having such curvature, relative to the flaring inner surface of said rim, that the rim increases in thickness from the laterally outer edge toward the central plane of the rim.

3. A molded rubber wheel for cotton pickers and other implements, comprising an integral hub, rim, and connecting disk-like web construction formed of rubber-like material, the hub portion consisting of substantially hard rubber, the rim portion being thin and wide and of substantially soft yielding rubber, and the intervening web portion being of harder rubber than the rim portion and being thin and corrugated circumferentially.

References Cited in the file of this patent

UNITED STATES PATENTS

| Number | Name | Date |
|---|---|---|
| 970,126 | Scullin | Sept. 13, 1910 |
| 1,386,389 | Wilson | Aug. 2, 1921 |
| 1,432,540 | Deister | Oct. 17, 1922 |
| 2,491,746 | MacLean | Dec. 20, 1949 |
| 2,603,267 | Simpson | July 15, 1952 |
| 2,605,592 | Cosmos | Aug. 5, 1952 |